Figure 1:
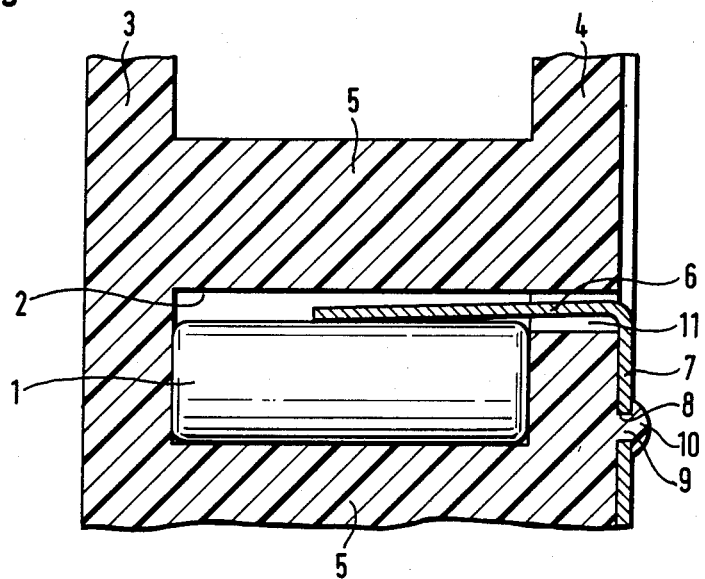

United States Patent [19]

Schaeffler

[11] Patent Number: 4,878,569
[45] Date of Patent: Nov. 7, 1989

[54] NOVEL CAGE

[75] Inventor: Georg Schaeffler, Herzogenaurach, Fed. Rep. of Germany

[73] Assignee: INA Walzlager Schaeffler KG, Fed. Rep. of Germany

[21] Appl. No.: 596,547

[22] Filed: Apr. 4, 1984

[30] Foreign Application Priority Data

Apr. 15, 1983 [DE] Fed. Rep. of Germany ....... 3313639

[51] Int. Cl.⁴ ............................................. F16D 3/34
[52] U.S. Cl. ..................................................... 192/45
[58] Field of Search ........................................... 192/45

[56] References Cited

U.S. PATENT DOCUMENTS

| | | | |
|---|---|---|---|
| 3,942,616 | 3/1976 | Elmore | 192/45 |
| 3,972,573 | 8/1976 | Marola | 192/45 X |
| 4,185,724 | 1/1980 | Kitchin | 192/45 |

*Primary Examiner*—John Fox
*Attorney, Agent, or Firm*—Bierman and Muserlian

[57] ABSTRACT

A novel cage for an overrunning roller clutch comprising pockets in the cage for accommodating cam rollers defined by cross bars connected at least at one end by end ring, each pocket being provided with a separate spring element formed by a leaf spring slightly tangentially inclined relative to the adjacent crossbar, the said leaf springs being connected at one end with an annular flange abutting against the outside of one end ring of the cage and passing through the leaf springs by a cutout.

2 Claims, 1 Drawing Sheet

U.S. Patent

Nov. 7, 1989

4,878,569

NOVEL CAGE

STATE OF THE ART

Cages for overrunning roller clutches wherein the cam rollers are accommodated in pockets defined by cross bars with an end ring and at least one end provided with separate spring elements slightly tangentially inclined relative to an adjacent web are known. U.S. Pat. No. 3,972,573 describes a cage for cam rollers of an overrunning clutch wherein each cam roller is assigned a separate spring element formed by a leaf spring but each leaf spring element has to be individually inserted into its respective cage pocket and fastened to the cage cross bar by a retaining means. This makes the assembly of the cage difficult and expensive and the cross-sectional shape of the cross bar and therefore the manufacture of the cage is more complicated. This disadvantage is a disturbing factor especially in very small overrunning roller clutches as used in precision machines, for example. Moreover, the leaf springs are very stiff due to the small spring movement so that no-load friction torque and therefore wear are increased.

OBJECTS OF THE INVENTION

It is an object of the invention to provide a cage for an overrunning roller clutch in which each cam roller is provided with a separate spring element and can be easily assembled even in the smallest size.

This and other objects and advantages of the invention will become obvious from the following detailed description.

THE INVENTION

The novel cage of the invention for an overrunning roller clutch is comprised of pockets in the cage for accommodating cam rollers defined by cross bars connected at least one end by end rings, each pocket being provided with a separate spring element formed by a leaf spring slightly tangentially inclined relative to the adjacent cross bar, the said leaf springs being connected at one end with a annular flange abutting against the outside of one end ring of the cage and passing through the leaf spring by a cutout.

By this construction, the individual leaf springs are combined into a single unit which simplifies handling during assembly. Also, it is no longer necessary to provide a separate holding element for each leaf spring and instead, the annular flange can be joined to the end ring in a simple manner, e.g. by gluing or the like. A further improvement is achieved in that the effective spring length of the leaf springs is increased by the thickness of the end ring and the tangential flexibility of the leaf springs is thereby increased resulting in reduced wear.

In another embodiment of the invention, it is provided that the annular flange and the leaf springs are formed in a single piece by stamping from flat stock and bending. Such a design has the advantage of low manufacturing costs and presents no problem in manufacture even in small dimensions.

Figure 2:
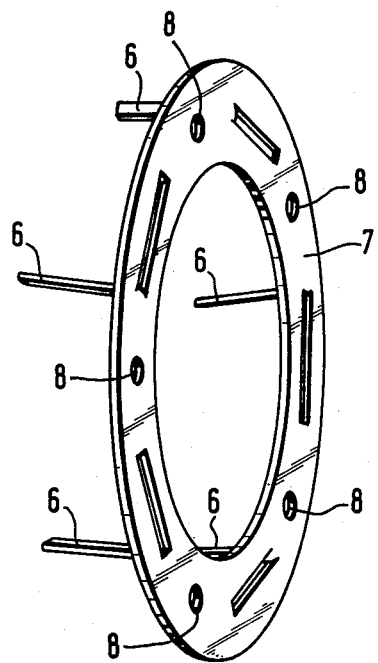

Referring now to the drawings:

FIG. 1 is a partial longitudinal cross-section through one embodiment of the cage of the invention and FIG. 2 is a perspective view of a circular ring-shaped flange with the leaf springs integrally formed in one piece.

In the cage of FIG. 1, the cam rollers 1 are received in cage pockets 2 which are defined by cross bars 5 connected at their ends by end rings 3 and 4. Each cam roller 1 is provided with a separate spring element formed by a leaf spring 6 slightly inclined in the tangential direction relative to an adjacent cross bar 5. The leaf springs 6 are connected at their one end with a annular flange 7 which abuts against one end ring 4 and is non-rotationally fixed by holes 8 through pegs 9 of the end ring 4 and is fastened by plastic deformation 10 of peg 9. The leaf springs 6 extend freely movable through cutouts 11 of the end ring 4.

As FIG. 2 shows, the annular flange 7 and the leaf springs 6 are formed in one piece from flat stock by stamping and bending.

Various modifications of the cage of the invention may be made without departing from the spirit or scope thereof and it is to be understood that the invention is to be limited only as defined in the appended claims.

What I claim is:

1. A cage for an overrunning roller clutch comprising pockets for accommodating cam rollers defined by cross bars connected at least at one end by an end ring, each pocket being provided with a separate spring element formed by a leaf spring slightly tangentially inclined relative to the adjacent cross bar, the said leaf springs being connected at one end with an annular flange abutting against the outside of one end ring of the cage and each leaf spring passing therethrough by a cutout.

2. A cage of claim 1 wherein the leaf spring and the cicular ring-shaped flange are formed in one piece by stamping and bending of flat stock.

* * * * *